UNITED STATES PATENT OFFICE.

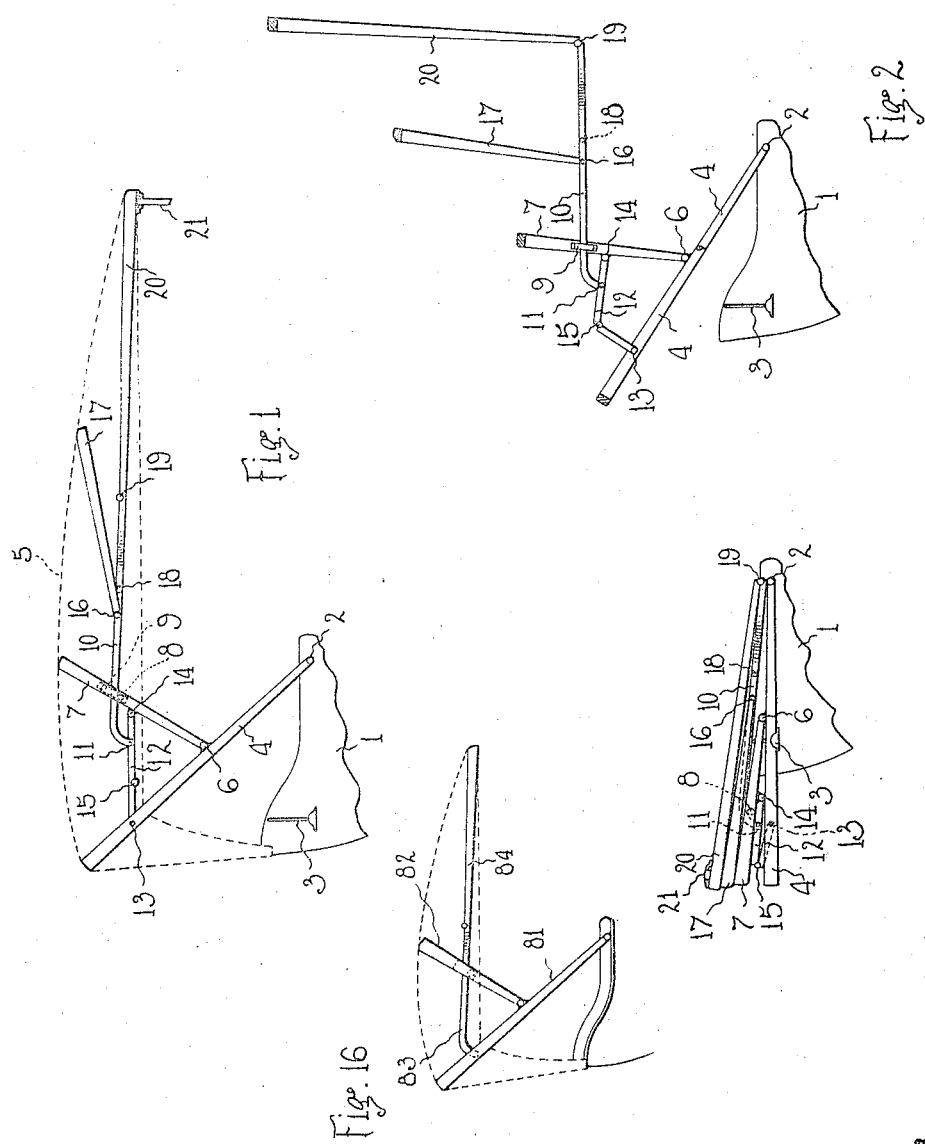

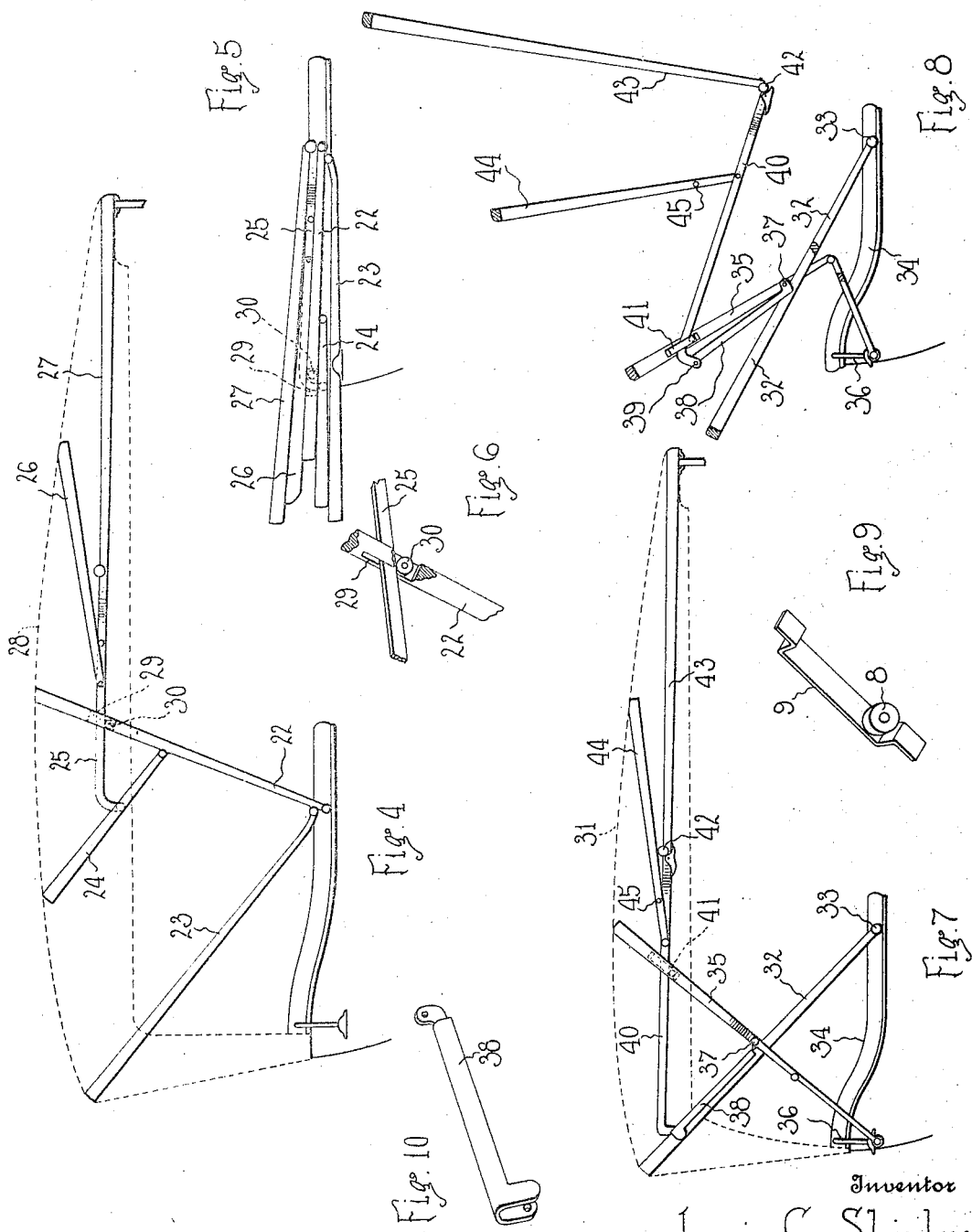

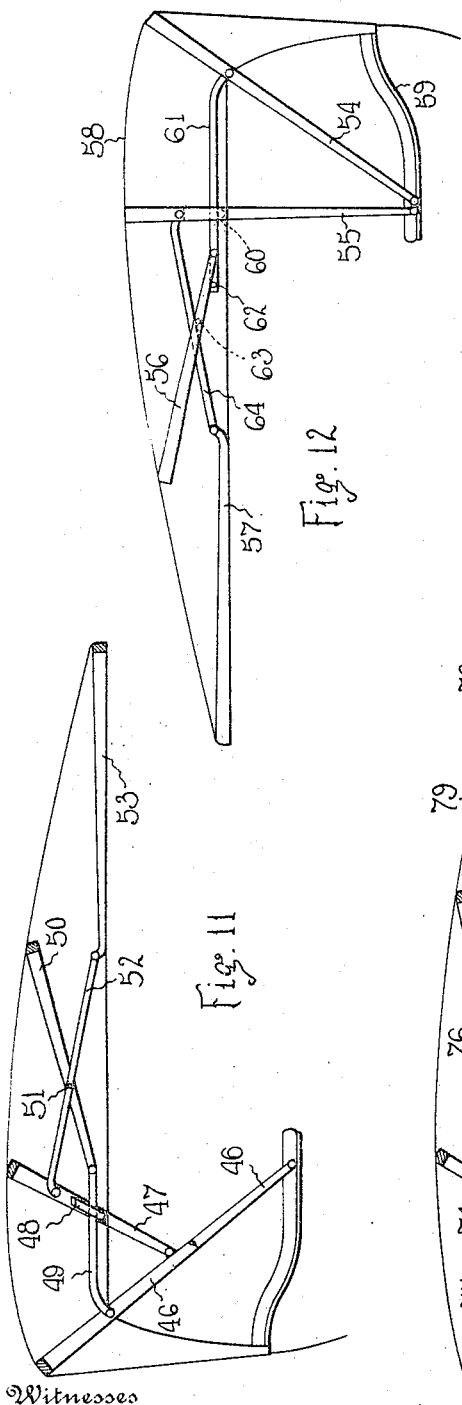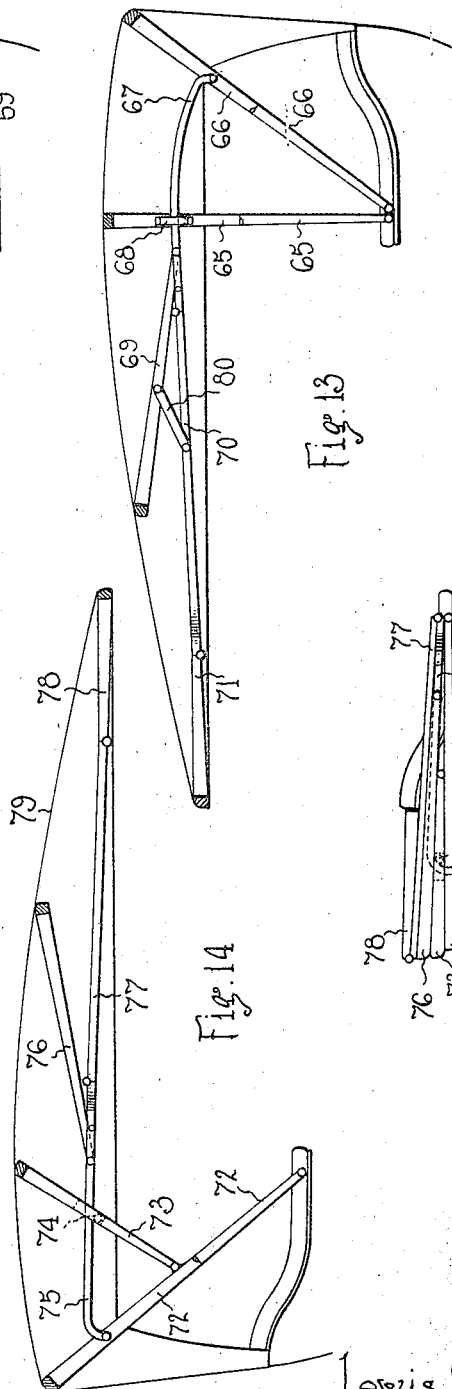

LEWIS C. SHIPLEY, OF DETROIT, MICHIGAN.

VEHICLE-TOP.

1,179,567.    Specification of Letters Patent.    Patented Apr. 18, 1916.

Application filed April 3, 1915. Serial No. 18,925.

*To all whom it may concern:*

Be it known that I, LEWIS C. SHIPLEY, a citizen of the United States of America, residing at Detroit, in the county of Wayne and State of Michigan, have invented certain new and useful Improvements in Vehicle-Tops, of which the following is a specification, reference being had therein to the accompanying drawings.

This invention relates to vehicle tops and more particularly to a novel arrangement of foldable or collapsible bows and bow sockets adapted to support a cover or canopy either closed or extended relative to an automobile body.

The various arrangements of bows and bow sockets to be hereinafter specifically described have been designed to insure rigidity, compactness when folded, easy manipulation, an unobstructed view from the seats of the automobile body, manufacture and installation at a comparatively small cost, and preclude any danger of the fabric of the top being cracked or otherwise injured by the bows or bow sockets.

Reference will now be had to the drawings, wherein—

Figure 1 is a side elevation of a vehicle top in a set up or extended position; Fig. 2 is a similar view partly broken away showing the vehicle top bows or bow socket as partly collapsed or folded; Fig. 3 is a side elevation of the bows and bow sockets completely folded; Fig. 4 is a side elevation of another form of vehicle top showing the bows and bow sockets in an extended position; Fig. 5 is a side elevation of the same showing the bows and bow sockets folded; Fig. 6 is a fragmentary perspective view of a main bow; Fig. 7 is a side elevation of another form of top in an extended position; Fig. 8 is a side elevation of the same partly broken away and partly in section, showing the bows and bow sockets partly folded; Fig. 9 is an enlarged perspective view of a bearing adapted to form part of a bow or bow socket; Fig. 10, is a perspective view of a detached member especially designed for the vehicle top shown in Figs. 7 and 8; Fig. 11 is a longitudinal sectional view of another form of vehicle top in an extended position; Fig. 12 is a side elevation of a still further modified form of top; Fig. 13 is a longitudinal sectional view of a still further modified form of top; Fig. 14 is a similar view of a still further modified form of top, showing the same in an extended position; Fig. 15 is a side elevation of the same top folded, and Fig. 16 is a side elevation of a further modified form of top, similar to that shown in Fig. 14.

Reference will first be had to Figs. 1, 2 and 3 showing a portion of an automobile body 1 as having side irons 2 and rests 3. Pivotally connected to the side irons 2 in the usual and well known manner are bow sockets or the ends of an inclined main bow 4, said bow extending rearwardly to the upper rear edge of the canopy or cover 5 forming part of the vehicle top. Pivotally connected to the front side of the bow 4, as at 6, are the bow sockets or ends of a front bow 7 adapted to coöperate with the main bow 4 in supporting the canopy or cover 5. The front bow 7, when in an extended position, is at an acute angle relative to the upper portion of the main bow 4, and at the inner side of the front bow 7 are roller bearings 8. These bearings are in straps or suitable housings 9 connected to the front bow and sliding through said straps, in engagement with the roller bearings 8, are side arms, which have the rear ends thereof curved and pivotally connected, as at 11 to break-up links 12 pivotally connected, as at 13, to the inner side of the main bow 4 and to the rear side of the front bow 7, as at 14. The sections of the break-up links are connected by rule joints 15 and the connections between the links 12 and the front bow 7 are set inwardly in order that the side arms 10 can be pivotally connected to said links. Pivotally connected to the outer side of the arms 10, as at 16, are the bow sockets or ends of a supplemental bow 17 supported at an acute angle relative to the outer ends of the arm 10 by pins 18, carried by said arms contiguous to the pivoted ends of the supplemental bow 17. The outer ends of the arms 10 are offset and connected thereto, by rule joints 19, are the bow sockets or ends of a horizontal bow 20, which coöperates with the bows 17, 7 and 4 in supporting the canopy or cover 5 in an extended position. The arms 10 are offset whereby the horizontal bow 20 will be in the same vertical plane as the sides of the bows 17, 7 and 4, thus permitting of these bows being folded or collapsed practically upon one another as shown in Fig. 3. The horizontal bow 20 has the outer end thereof provided with straps 21 or suitable fastening devices whereby the horizontal bow can be connected to a windshield or a portion of the automobile to maintain the bow sockets and bows in a set up and extended position. When the horizontal bow 20 is released from its fastening means, the main bow 4 swings onto the rests 3 and the horizontal bow 20 and the supplemental bow 17 can be pushed upwardly and rearwardly and the links 12 broken whereby the various bows forming the framework of the top can be folded and collapsed at the rear end of the body 1. In connection with this particular form of vehicle top, it will be observed by reference to Fig. 1, showing the canopy or cover 5 in dotted lines, that the links 12, the arms 10, the bows 17 and 20, and the upper portions of the bows 4 and 7 are inclosed by the canopy or cover and only portions of the bows 4 and 7 exposed beneath the lower edges of the canopy or cover, thereby providing an extremely neat appearing structure that does not obstruct the view from the seats in the automobile body, besides providing considerable clearance for persons entering or leaving the vehicle. In this form of vehicle top, the canopy or cover 5 is supported by four bows which coöperate with back stays and fasteners in maintaining a rigid overhanging framework that is applicable to automobile bodies of various sizes and styles.

As showing a five bow framework for vehicle tops, reference will be had to Figs. 4 and 5, wherein 22 denotes a main bow having a rearwardly projecting rear bow 23 and a rearwardly projecting intermediate bow 24. In sliding engagement with the main bow 22 are arms 25 corresponding to the arms 10 previously described. The arms 25 are pivotally connected to the intermediate bow 24 and said arms support a supplemental bow 26 and a horizontal bow 27. The bows 26 and 27 and their appurtenant parts are similar to the bows 17 and 20 heretofore referred to. In this form of top the main bow 22 projects forwardly and the various bows are disposed to be advantageously used in connection with a canopy or cover of considerable size. The five bow framework can be easily and quickly folded or collapsed after the horizontal bow 27 has been released and all of the bows are positioned to correctly support a canopy or cover 28 with only portions of the bows 22, 23 and 24 exposed. In this particular form of top, the straps or housings 9 may be dispensed with and the main bow 22 slotted, as at 29 to receive rollers 30 and the arms 25, and this construction is applicable to any form of vehicle top where the arms can be placed in the same plane as the sides of a bow.

Reference will now be had to Figs. 7, 8 and 10 illustrating a four bow framework for a canopy or cover 31. In this instance a rear bow 32 is pivotally connected, as at 33, to side irons or an automobile body 34, said rear bow extending rearwardly, at an inclination, to the upper rear edge of the canopy or cover 31. A break-down front bow 35 is pivotally connected to rests 36 and to the rear bow 32, as at 37, the same pivots supporting channel members 38 adapted to rest upon the rear bow 32. The channel members 38 have the upper ends thereof pivotally connected, as at 39, to arms 40, said arms having a sliding connection with the front bow 35, as at 41. The outer ends of the arms 40 are offset and connected, by rule joints 42, to a horizontal bow 43 and to maintain said horizontal bow in an extended position or in the same plane as the arms 40, I use lock joints or snap fasteners of that type disclosed by my Patent No. 1,127,099, granted Feb. 2, 1915. Connected to the arms 40, adjacent to the offset outer ends thereof are the bow sockets or ends of a supplemental bow 44 and this bow is provided with pins 45 adapted to engage and rest upon the arms 40 to support the supplemental bow 44 at an acute angle relative to the outer offset ends of said arms. In folding this type of framework, the front bow 35 breaks down as clearly shown in Fig. 8 and the channel members 38 move in proximity to the front bow, whereby the horizontal bow 43, supplemental bow 44 and the upper portion of the front bow 35 can be swung and lowered to superimposed position upon the rests 36. This four bow top provides an extremely rigid structure, insomuch that the front and rear bows are pivotally connected together and the channel members held by the same pivotal means in a plane whereby they can rest upon the rear bow and correctly support the arms 40 when the framework is in a set up or extended position, as shown in Fig. 7. While this type of top may be more expensive than those previously described, yet it possesses many characteristics which render it particularly applicable to large and high grade automobiles.

In Fig. 11 there is shown a construction somewhat along the line suggested by Fig. 1, wherein a rearwardly projecting main bow 46 has a pivoted front bow 47 provided with bearings 48 for arms 49. The arms 49 have the rear ends thereof pivotally connected to the main bow 46 and the forward ends thereof pivotally connected to the ends of a supplemental bow 50. This supplemental bow is pivotally connected, as at 51, to links 52 and said links have the rear ends thereof pivotally connected to the front bow 47 and the forward ends thereof pivotally connected to the ends of a horizontal bow 53. This construction provides a four bow top of novel design that can be easily and quickly folded or collapsed at the rear end of an automobile body.

Another form of top is shown in Fig. 12, wherein a main bow 54, a front bow 55, a supplemental bow 56 and a horizontal bow 57 coöperate in supporting a canopy or cover 58. The bows 54 and 55 are pivotally connected to an automobile body 59 with the front bow vertically disposed and the main bow extending rearwardly to the upper rear edge of the canopy or cover 58. The front bow 55 is provided with bearings 60 for arms 61, said arms having the rear ends thereof pivotally connected to the main bow 54. The supplemental bow 56 has the ends thereof connected to the arms 61, contiguous to the forward ends thereof, and the forward ends of said arms have pins 62 adapted to maintain the supplemental bow 56 in an extended position. The supplemental bow 56 has inwardly projecting pins 63 and these pins are adapted to support links 64 pivotally connected to the horizontal bow 57 and also to the front bow 55. This arrangement of bows is unique insomuch that the supplemental bow 56 is supported by the forward ends of the arms 61 and said supplemental bow coöperates with the front bow 55 in supporting the links 64 and horizontal bow 57 connected to said links.

An arrangement of bows somewhat similar to that shown in Fig. 12, is also shown in Fig. 13, wherein 65 denotes a front bow; 66 a main bow; 67 arms pivotally connected to the main bow and extending through straps or bearings 68 carried by the front bow 65; 69 a supplemental bow supported by the arm 67; 70 long links connected to the arms 67 by rule joints; 80 short links pivotally connected to said long links and to said supplemental bow; and 71 a horizontal bow connected to the long links 70 by rule joints. The links 70 and the horizontal bow 71 provide practically a break-down horizontal bow of considerable length and it is an extremely easy matter to fold and collapse a top constructed in accordance with this particular design.

A good top construction is shown in Figs. 14 and 15 which is similar to the construction disclosed in Fig. 1. It is by far the better on account of the links 12 being dispensed with and a small horizontal bow used in connection with long links attached to arms. The main bow is designated 72 and pivotally connected thereto is a front bow 73. This front bow has bearings 74 for arms 75 connected to the main bow 72. The arms 75 support the supplemental bow 76 and have a rule joint connection with long links 77, said links also having a rule joint connection with a horizontal bow 78. This arrangement provides a four bow framework of considerable rigidity and the bows are disposed to support a large canopy or cover 79. When this type of top is collapsed or folded, the horizontal bow 78 is folded forwardly upon the links 77 and even though the top possesses considerable length when extended, yet it occupies a comparatively small space at the rear of an automible body when folded.

In Fig. 16, a main bow 81 has a front bow 82 and arms 83, said arms having a sliding rest on said front bow and the outer ends thereof connected to a horizontal bow 84. This top is especially designed for two passenger vehicles.

From the foregoing it will be observed that of all the various forms of automobile tops, that the form shown in Fig. 4 embodies the principle of the remaining forms, the remaining forms being more or less a modification of the novel top shown in Fig. 4. In this form the guide rests or bearings of the main or front bow 22 sustains practically the entire load of the supplemental and horizontal bow, and with the horizontal bow suitably fastened to a windshield or automobile body the entire structure is firmly held against accidental displacement.

Throughout the above description, when using the terms "bow" or "bow sockets", I desire to be understood that these terms include any frames or members capable of forming a skeleton framework for a canopy or cover, also, that such terms as "pivotally connected", "pivoted", "rule joints", "sliding connections," etc. refer to any means of connecting the parts of the top whereby the parts or bows will properly fold. Furthermore the bows are to be proportioned to properly fold and fit together to form a top of any desired size or contour that can be easily manipulated.

While there has been described a few forms, it is possible to combine certain bows, arms and links and obtain a framework somewhat different from any form shown, therefore, I desire to be understood that this invention includes any vehicle top which falls within the scope of the appended claims.

What I claim is:—

1. In a vehicle top, the combination with a vehicle body having side irons and rests, of a framework adapted for supporting a cover for said vehicle body, comprising a rear bow connected to said side irons, and extending rearwardly at an inclination, a break down front bow connected to said rests and to said rear bow, arms having a sliding connection with said break down front bow and having the rear ends thereof movably supported on said rear bow, and means carried by said arms and coöperating with said bows in supporting a vehicle top cover.

2. In a vehicle top, the combination of a vehicle body having side irons and rests, of a framework adapted for supporting a cover for the vehicle body, comprising a rear inclined bow connected to said side irons, an inclined break down front bow connected to said rests and to said inclined rear bow, arms having a sliding connection with said inclined front bow and having the rear ends thereof movably supported on said rear bow, a supplemental bow supported by said arms, and a horizontal bow connected to said arms.

3. In a vehicle top, the combination with a vehicle body having side irons and rests, of an inclined rear bow connected to the side irons of said body, an inclined front bow pivotally connected to said inclined rear bow and having breakdown portions pivotally connected to said rests, arms having a sliding connection with said front bow and ends thereof movably supported on said rear bow, and means carried by said arms and coöperating with said bows in supporting a vehicle top cover.

In testimony whereof I affix my signature in presence of two witnesses.

LEWIS C. SHIPLEY.

Witnesses:
ANNA M. DORR,
KARL H. BUTLER.